United States Patent
Yeh et al.

(10) Patent No.: US 9,297,630 B2
(45) Date of Patent: Mar. 29, 2016

(54) APPARATUS OF MEASURING WORKPIECE

(71) Applicant: LEADJACK AUTOMATION CO., LTD., Taichung (TW)

(72) Inventors: Chin-Cheng Yeh, Kaohsiung (TW); Tzu-Hsiung Chou, Kaohsiung (TW); Wen-Yu Chang, Taichung (TW)

(73) Assignee: Leadjack Automation Co., Ltd., Taichung (TW)

(*) Notice: Subject to any disclaimer, the term of this patent is extended or adjusted under 35 U.S.C. 154(b) by 71 days.

(21) Appl. No.: 14/483,340

(22) Filed: Sep. 11, 2014

(65) Prior Publication Data

US 2015/0082651 A1   Mar. 26, 2015

(30) Foreign Application Priority Data

Sep. 25, 2013   (TW) .............................. 102217982 U

(51) Int. Cl.
   *G01B 5/20*   (2006.01)
   *G01B 5/10*   (2006.01)

(52) U.S. Cl.
   CPC . *G01B 5/201* (2013.01); *G01B 5/10* (2013.01)

(58) Field of Classification Search
   CPC .................................... G01B 5/02; G01B 5/10
   USPC .................... 33/546, 550, 551, 552, 783, 803
   See application file for complete search history.

(56) References Cited

U.S. PATENT DOCUMENTS

| | | | | |
|---|---|---|---|---|
| 2,515,214 A * | 7/1950 | Goldberg | ............... | G01B 5/201 33/501 |
| 3,974,569 A * | 8/1976 | Albertazzi | ............... | G01B 5/02 33/501.05 |
| 4,092,781 A * | 6/1978 | Blake | ....................... | G01B 5/02 33/501.4 |
| 4,473,951 A * | 10/1984 | Golinelli | .................. | G01B 7/12 33/501.6 |
| 4,958,442 A * | 9/1990 | Eckhardt | .................. | G01B 5/08 33/550 |
| 5,177,875 A * | 1/1993 | Pienta | ...................... | G01B 5/02 33/1 M |
| 5,351,410 A * | 10/1994 | Hainneville | ............. | G01B 5/08 33/542 |
| 5,383,283 A * | 1/1995 | Olsen | ....................... | G01B 5/08 33/555.1 |
| 6,256,898 B1 * | 7/2001 | Trionfetti | .................. | B24B 5/04 33/551 |
| 6,308,431 B1 * | 10/2001 | Takanashi | ............ | B23Q 17/003 33/706 |
| 2005/0278968 A1 * | 12/2005 | Takahashi | ................ | G01B 5/20 33/551 |
| 2010/0018298 A1 * | 1/2010 | Kanematsu | .......... | G01B 5/0004 73/104 |

* cited by examiner

*Primary Examiner* — G. Bradley Bennett
(74) *Attorney, Agent, or Firm* — Rosenberg, Klein & Lee

(57) ABSTRACT

The apparatus of measuring a workpiece according to the present disclosure includes a base, a measuring member, an upper arm member, a lower arm member, a first pin and a second pin, wherein the upper arm member includes an upper rotation frame and the lower arm member includes a lower rotation frame. When the first pin is moved to disconnect the upper rotation frame from the lower rotation frame, the upper rotation frame is rotatable. When the second pin is moved to lock the lower rotation frame to the measuring member, the lower rotation frame is free of rotation. When the first pin is moved to connect the upper rotation frame and the lower rotation frame with each other and when the second pin is moved to unlock the lower rotation frame from the measuring member, the lower rotation frame is rotatable with the upper rotation frame.

2 Claims, 10 Drawing Sheets

APPARATUS OF MEASURING WORKPIECE

CROSS REFERENCE TO RELATED APPLICATION

The present application is based on and claims priority to Taiwanese Application Number 102217982, filed Sep. 25, 2013, the disclosure of which is hereby incorporated by reference herein in its entirety.

BACKGROUND

1. Technical Field

The disclosure relates to a measuring apparatus, and more particularly, to an apparatus of measuring a workpiece.

2. Description of the Related Art

Referring to FIGS. 1 and 2, a conventional apparatus 90 of measuring a workpiece includes a horizontal rail 91 and a measuring member 92 that is movable on the horizontal rail 91. The measuring member 92 has a threaded rail 921, an upper driving portion 922, a lower driving portion 923, an upper arm 924 and a lower arm 925. The threaded rail 921 is divided into an upper threaded section 921A and a lower threaded section 921B, wherein the upper threaded section 921A has a thread direction reverse to that of the lower threaded section 921B. The upper driving portion 922 is movably positioned at the upper threaded section 921A and the lower driving portion 923 is movably positioned at the lower threaded section 921B. The upper arm 924 is positioned at the upper driving portion 922 and the lower arm 925 is positioned at the lower driving portion 923. When the upper driving portion 922 moves at the threaded rail 921, it will cause the threaded rail 921 to rotate accordingly. This way the upper arm 924 and lower arm 925 will move simultaneously in reverse directions. Similarly, the movement of the lower driving portion 923 at the threaded rail 921 may also cause the upper arm 924 and lower arm 925 to move simultaneously in reverse directions.

However, the conventional apparatus 90 of measuring a workpiece has the drawbacks as follows:

(1) Since the upper arm 924 and lower arm 925 are driven to move simultaneously in reverse directions, the run-out of a workpiece 70 toward either of the upper arm 924 and lower arm 925 will cause the upper arm 924 and lower arm 925 to move away from each other. This will hinder the run-out measurement of the workpiece 70.

(2) Since the upper arm 924 and lower arm 925 are driven to move simultaneously, the connection between the upper threaded section 921A and lower threaded section 921B is required to be positioned corresponding to the axis of the workpiece 70 in order to take an accurate measurement.

(3) Since the upper arm 924 and lower arm 925 are driven to move simultaneously, it is difficult to determine whether the eccentricity of the workpiece of a roller originally comes from the production of the roller, a deformation of the roller neck or a grinding process of the roller.

Accordingly, there exists a need to provide a solution to solve the aforesaid problems.

SUMMARY

The present disclosure provides an apparatus of measuring a workpiece.

In one embodiment, the apparatus of measuring a working according to the present disclosure includes a base, a measuring member, an upper arm member, a lower arm member, a first pin and a second pin. The base includes a workpiece supporting portion for clamping a workpiece, a workpiece driving portion for rotating the workpiece supporting portion, and a horizontal rail. The measuring member is movably positioned at the horizontal rail and includes a frame driving portion, an upper pivoting portion and a lower pivoting portion. The upper arm member includes an upper rotation frame having opposing ends to be connected to the frame driving portion and the upper pivoting portion respectively, an upper arm rail, an upper arm driving portion movably positioned at the upper arm rail, and an upper arm positioned at the upper arm driving portion, wherein the frame driving portion is configured to rotate the upper rotation frame. The lower arm member includes a lower rotation frame having opposing ends to be pivotally connected to the upper pivoting portion and the lower pivoting portion respectively, a lower arm rail, a lower arm driving portion movably positioned at the lower arm rail, and a lower arm positioned at the lower arm driving portion. The first pin is configured to selectively connect the upper rotation frame with the lower rotation frame. The second pin is configured to selectively lock the lower rotation frame to the measuring member. When the first pin is moved to disconnect the upper rotation frame from the lower rotation frame, the upper rotation frame is rotatable. When the second pin is moved to lock the lower rotation frame to the measuring member, the lower rotation frame is free of rotation. When the first pin is moved to connect the upper rotation frame and the lower rotation frame with each other and when the second pin is moved to unlock the lower rotation frame from the measuring member, the lower rotation frame is rotatable with the upper rotation frame.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 1:
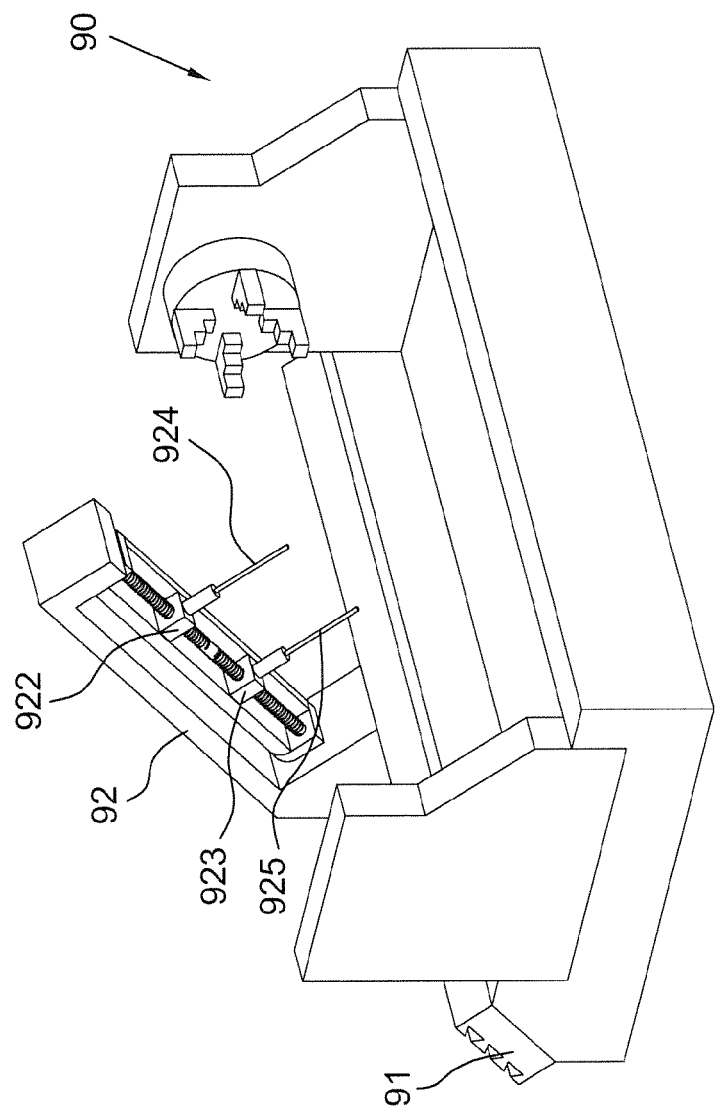
FIG. 1 is an elevated perspective view of a conventional apparatus of measuring a workpiece.
Figure 2:
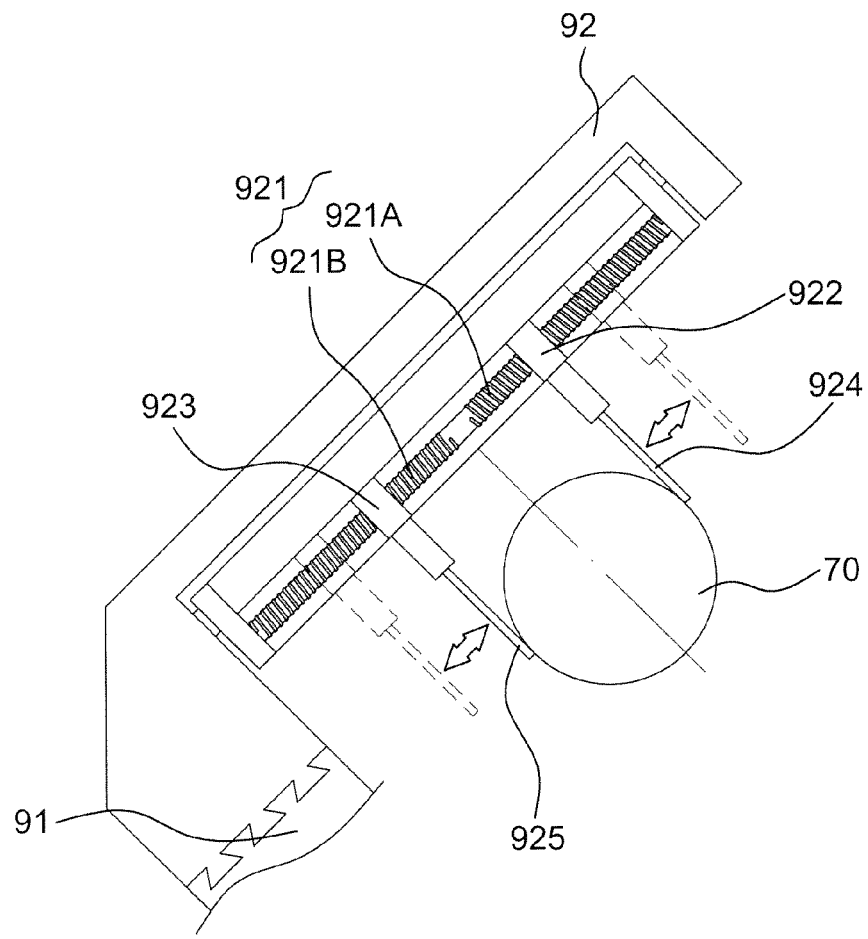
FIG. 2 is a side view of the conventional apparatus of FIG. 1.
Figure 3:
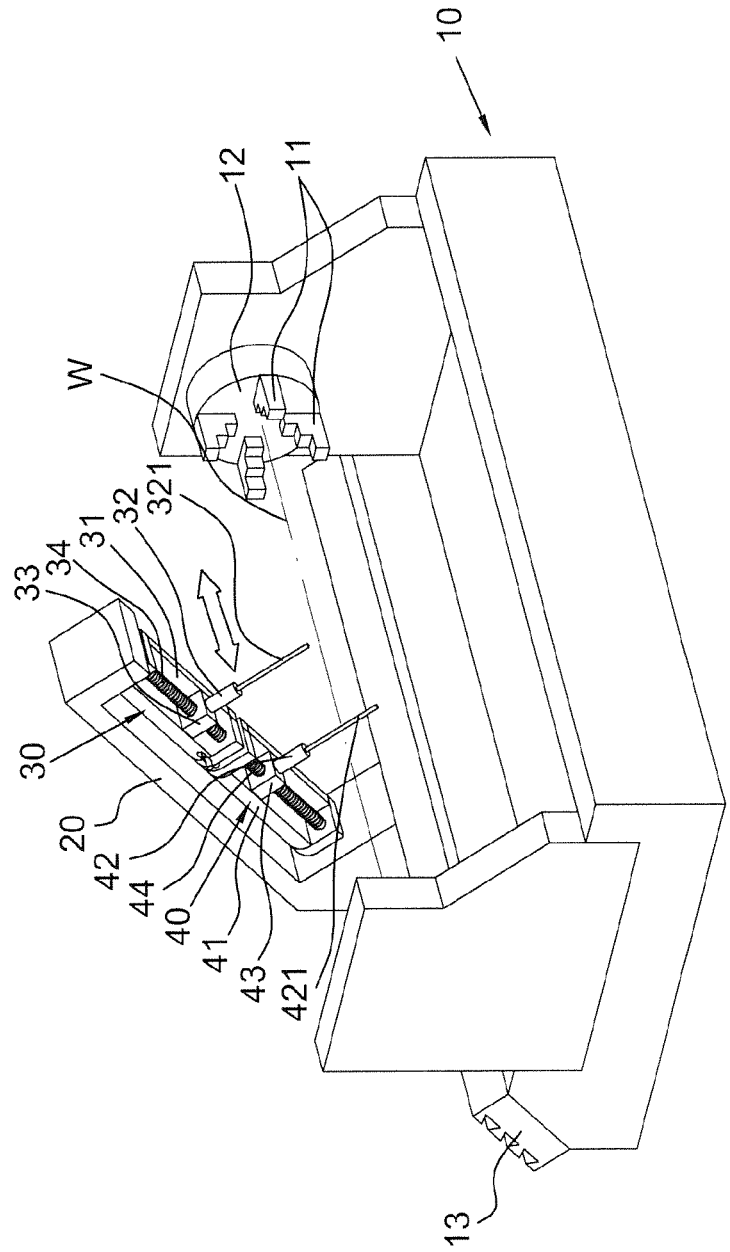
FIG. 3 is an elevated perspective view of the apparatus of measuring a workpiece according to the present disclosure.

Referring to FIGS. 3 to 6, the apparatus of measuring a workpiece according to the present disclosure includes a base 10, a measuring member 20, an upper arm member 30, a lower arm member 40 and a pin-fixing member. The base 10 includes a workpiece supporting portion 11, a workpiece driving portion 12 and a horizontal rail 13. The workpiece supporting portion 11 is positioned to clamp a workpiece 70 and the workpiece driving portion 12 is positioned to drive the workpiece supporting portion 11 to rotate such that the workpiece 70 may rotate about a rotation axis W. The measuring member 20 is movably positioned at the horizontal rail 13 and includes a frame driving portion 21, an upper pivoting portion 22 and a lower pivoting portion 23. The upper arm member 30 includes an upper rotation frame 31, an upper arm 32, an upper arm driving portion 33 and an upper arm rail 34. The upper rotation frame 31 has two opposing ends, one of which is connected to the frame driving portion 21 and the other end is pivotally connected to the upper pivoting portion 22. The upper arm 32 is positioned at the upper arm driving portion 33, wherein the upper arm driving portion 33 is movably positioned at the upper arm rail 34. The frame driving portion 21 is arranged to drive the upper rotation frame 31 to rotate. The lower arm member 40 includes a lower rotation frame 41, a lower arm 42, a lower arm driving portion 43 and a lower arm rail 44. The lower rotation frame 41 has two opposing ends, one of which is pivotally connected to the upper pivoting portion 22 and the other end is pivotally connected to the lower pivoting portion 23. The lower arm 42 is positioned at the lower arm driving portion 43, wherein the lower arm driving portion 43 is movably positioned at the lower arm rail 44.

Figure 8A:
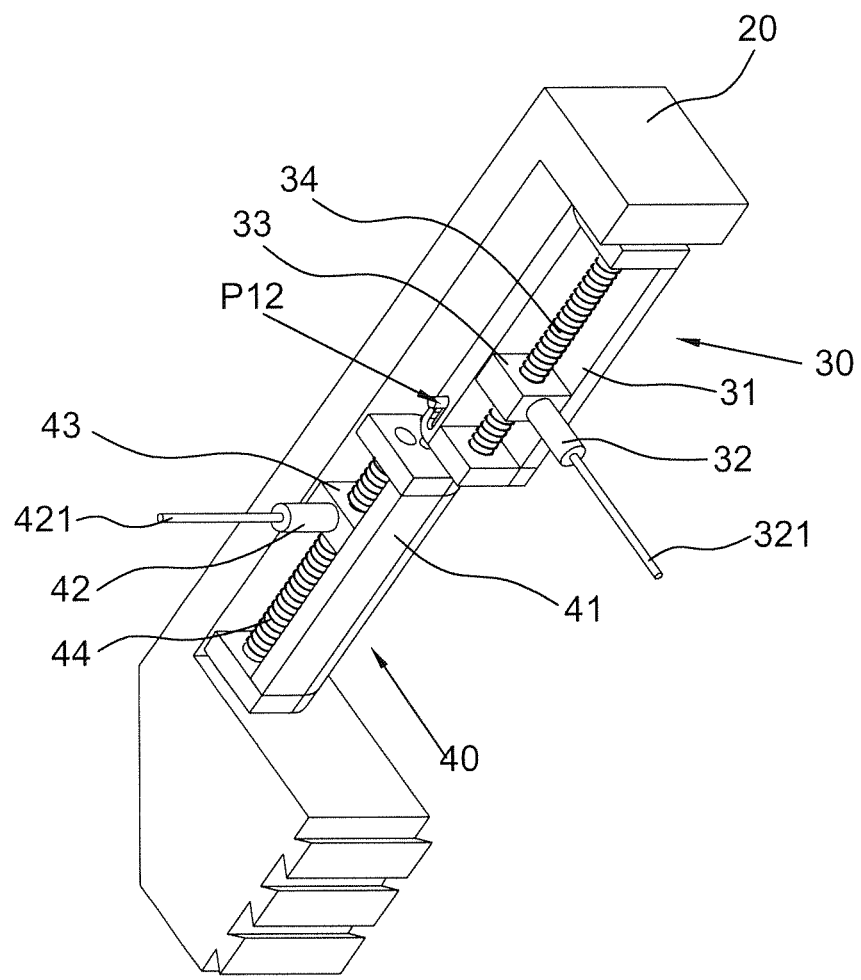
FIG. 8A is an elevated perspective view illustrating that the upper arm member is rotatable independently from the lower arm member according to the present disclosure.
Figure 8B:
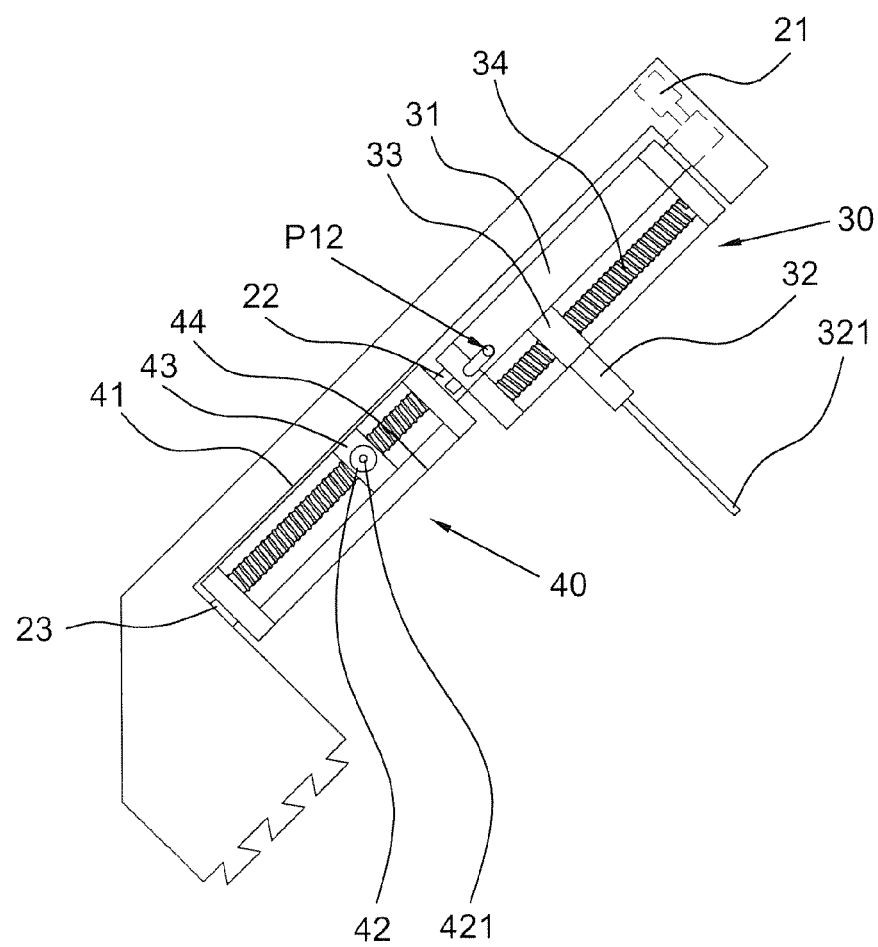
FIG. 8B is a side view illustrating that the upper arm member is rotatable independently from the lower arm member according to the present disclosure.

The pin-fixing member includes a first pin portion 51 and a second pin portion 52. The first pin portion 51 has a connection position P11 and a disconnection position P12 and the second pin portion 52 has a fixed position P21 and a rotation position P22. When the first pin portion 51 is at the connection position P11, the upper rotation frame 31 and lower rotation frame 41 are connected with each other. When the first pin portion 51 is at the disconnection position P12, the upper rotation frame 31 and lower rotation frame 41 are disconnected from each other. Specifically, when a pin of the first pin portion 51 is moved to the connection position P11, the pin of the first pin portion 51 will connect the upper rotation frame 31 with the lower rotation frame 41. When the pin of the first pin portion 51 is moved to the disconnection position P12, the lower rotation frame 41 will be disconnected from the upper rotation frame 31. Referring to FIGS. 8A and 8B, when the first pin portion 51 is at the disconnection position P12, the upper rotation frame 31 and lower rotation frame 41 are disconnected from each other. When the second pin portion 52 is at the fixing position P21, the lower rotation frame 41 is at a fixed state. When the second pin portion 52 is at the rotation position P22, the lower rotation frame 41 is at a rotatable state. Specifically, when a pin of the second pin portion 52 is moved to the fixing position P21, the pin of the second pin portion 52 will lock the lower rotation frame 41 to the measuring member 20. At this state the lower rotation frame 41 is not rotatable. When the pin of the second pin portion 52 is moved to the rotation position P22, the lower rotation frame 41 will be unlocked from the measuring member 20. At this state the lower rotation frame 41 is rotatable. With changing the positions of the pins of the first and second pin portions 51, 52, the rotations of the upper and lower rotation frames 31, 41 may be controlled.

Figure 4:
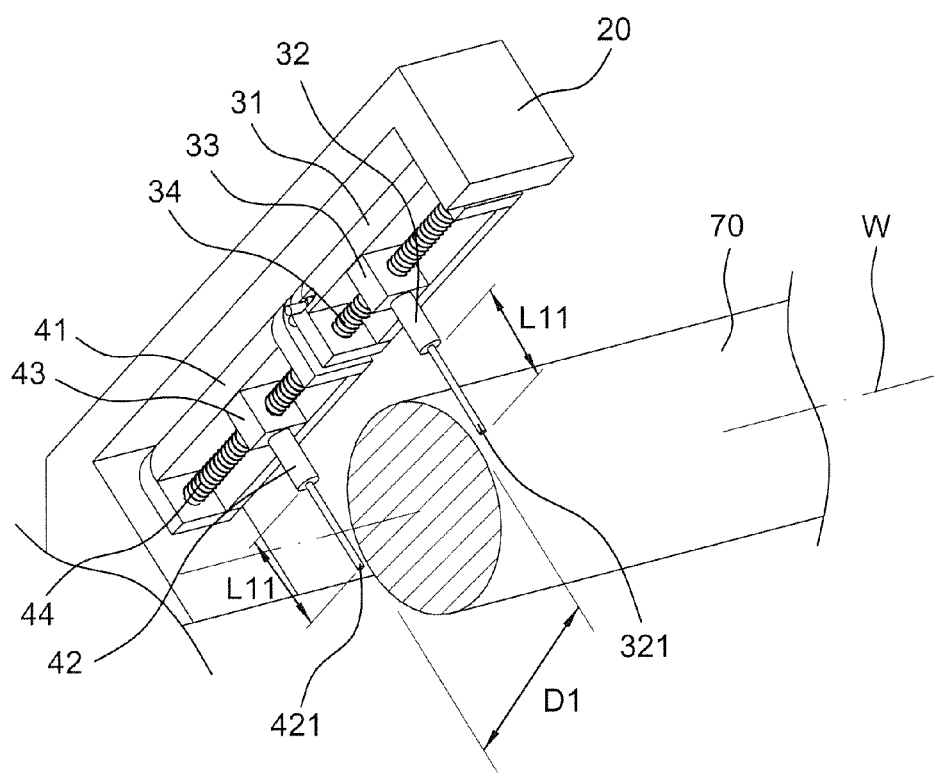
FIG. 4 illustrates that the apparatus of the present disclosure is used to measure a workpiece with a diameter of D1.
Figure 5:
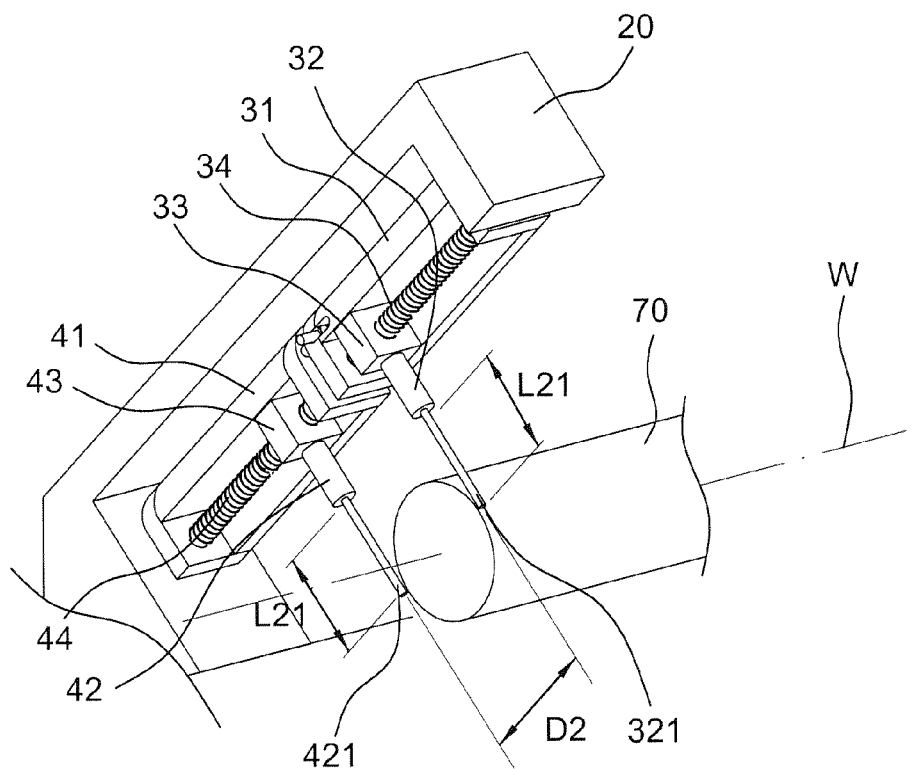
FIG. 5 illustrates that the apparatus of the present disclosure is used to measure a workpiece with a diameter of D2.
Figure 6:
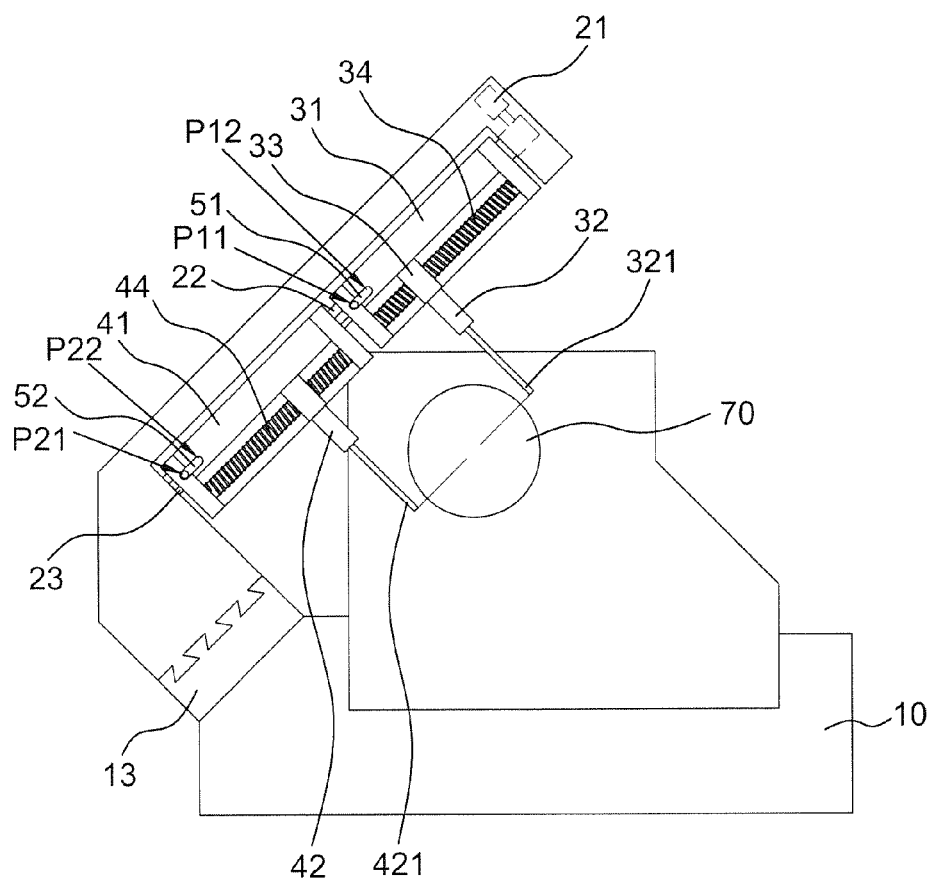
FIG. 6 is a side view of the apparatus of measuring a workpiece according to the present disclosure.

Referring to FIGS. 4 and 5, an upper extending portion 321 is positioned to extend from the upper arm 32 and a lower extending portion 421 is positioned to extend from the lower arm 42. When desiring to measure the diameter of a cylindrical workpiece 70, the upper and lower arm driving portions 33, 43 move on the upper and lower arm rails 34 and 44 respectively and the upper and lower extending portions 321, 421 are adjusted such that the upper and lower extending portions 321, 421 are positioned to be in contact with the lateral surface of the cylindrical workpiece 70. As shown in FIG. 4, when the cylindrical workpiece 70 has a diameter of D1, the upper and lower extending portions 321, 421 are adjusted to extend from the upper and lower arms 32, 42 respectively for a first length of L11 such that the upper and lower extending portions 321, 421 are in contact with the lateral surface of the cylindrical workpiece 70. When the cylindrical workpiece 70 has a diameter of D2 that is smaller than D1, as shown in FIG. 5, the upper and lower extending portions 321, 421 are adjusted to extend from the upper and lower arms 32, 42 respectively for a second length of only L21.

Figure 7A:
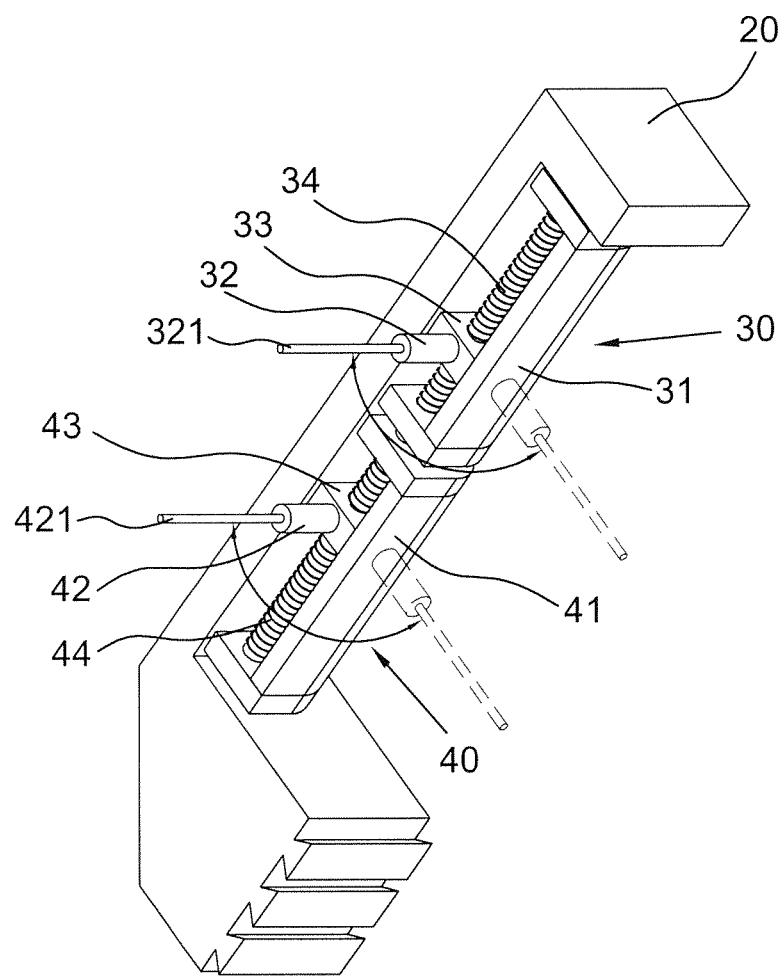
FIG. 7A is an elevated perspective view illustrating that the lower arm member is rotatable with the upper arm member according to the present disclosure.
Figure 7B:
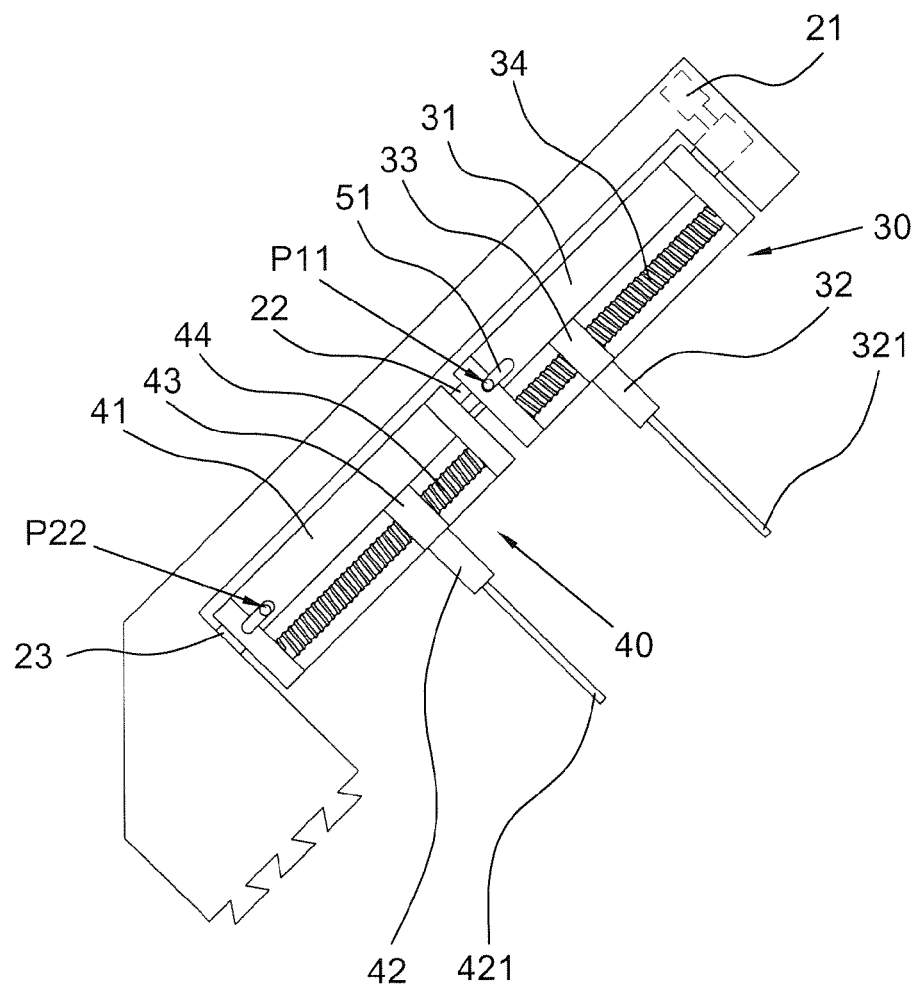
FIG. 7B is a side view illustrating that the lower arm member is rotatable with the upper arm member according to the present disclosure.

The pin-fixing member may be adjusted to operate with two states. As shown in FIGS. 7A and 7B, when the first pin portion 51 is arranged to be at the connection position P11 to connect the upper and lower rotation frames 31, 41 with each other and the second pin portion 52 is arranged to be at the rotation position P22 to have the lower rotation frame 41 rotatable, the frame driving portion 21 may rotate both the upper and lower arm members 30, 40. Referring to FIGS. 8A and 8B, when the first pin portion 51 is arranged to be at the disconnection position P12 to disconnect the lower rotation frame 41 from the upper rotation frame 31 and the second pin portion 52 is arranged to be at the fixed position P21 to have the lower rotation frame 41 fixed, the frame driving portion 21 may rotate only the upper arm member 40.

According to the present invention, the apparatus of measuring a workpiece may measure the diameter, roundness, run-out and curvature change of a workpiece.

As described above, when desiring to measure the diameter of the workpiece 70, the upper and lower arm driving portions 33, 43 move on the upper and lower arm rails 34 and 44 respectively and the upper and lower extending portions 321, 421 are adjusted to be in contact with the lateral surface of the workpiece 70. When desiring to measure the run-out of the workpiece 70, the workpiece driving portion 12 rotates the workpiece 70. Afterward, the measurements of the diameter of the workpiece 70 are taken as described above. The changes of the positions of the upper and lower arms 32, 42 with the rotation of the workpiece 70 indicate the run-out of the workpiece 70. As to the measurement of roundness, the upper extending portion 321 is positioned to be in contact with the lateral surface of the workpiece 70 when the workpiece 70 is rotated. The change of the position of the upper arm 32 indicates the roundness of the workpiece 70. In addition, since the measuring member 20 may move along the horizontal rail 13, the upper and lower arm members 30, 40 may move parallel to the rotation axis W to take the curvature measurements at different lengthwise positions of the workpiece 70. Accordingly, the curvature change of the workpiece along the lengthwise direction may be determined.

In view of the above, the apparatus of measuring a workpiece according to the present disclosure has the advantages as follows:

(1) Since the upper arm 32 and lower arm 42 move independently in comparison with the conventional apparatus 90 that the upper arm 924 and lower arm 925 move simultaneously in reverse directions, the run-out measurement may be taken accurately.

(2) Since the upper arm 32 and lower arm 42 move independently, there exists no conventional problem that the connection between the upper threaded section 921A and lower threaded section 921B is required to be positioned corresponding to the axis of the workpiece 70 as explained above about the conventional apparatus 90.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An apparatus of measuring a workpiece, comprising:
    a base, comprising:
        a workpiece supporting portion, configured to clamp a workpiece;
        a workpiece driving portion, configured to rotate the workpiece supporting portion; and
        a horizontal rail;
    a measuring member movably positioned at the horizontal rail, the measuring member includes a frame driving portion, an upper pivoting portion and a lower pivoting portion;
    an upper arm member, comprising:
        an upper rotation frame, having opposing ends to be connected to the frame driving portion and the upper pivoting portion respectively, wherein the frame driving portion is configured to rotate the upper rotation frame;
        an upper arm rail;
        an upper arm driving portion movably positioned at the upper arm rail; and
        an upper arm positioned at the upper arm driving portion;
    a lower arm member, comprising:
        a lower rotation frame, having opposing ends to be pivotally connected to the upper pivoting portion and the lower pivoting portion, respectively:
        a lower arm rail;
        a lower arm driving portion movably positioned at the lower arm rail; and
        a lower arm positioned at the lower arm driving portion;
    a first pin, configured to selectively connect the upper rotation frame with the lower rotation frame; and
    a second pin, configured to selectively lock the lower rotation frame to the measuring member;
    wherein when the first pin is moved to disconnect the upper rotation frame from the lower rotation frame, the upper rotation frame is rotatable;
    wherein when the second pin is moved to lock the lower rotation frame to the measuring member, the lower rotation frame is unrotatable; and
    wherein when the first pin is moved to connect the upper rotation frame and the lower rotation frame with each other and the second pin is moved to unlock the lower rotation frame from the measuring member, the lower rotation frame is rotatable with the upper rotation frame.

2. The apparatus as claimed in claim 1, further comprising:
    an upper extending portion, extending from the upper arm; and
    a lower extending portion, extending from the lower arm.

* * * * *